United States Patent
Luke et al.

(10) Patent No.: US 10,445,365 B2
(45) Date of Patent: Oct. 15, 2019

(54) STREAMING RADIO WITH PERSONALIZED CONTENT INTEGRATION

(71) Applicant: Amazon Technologies, Inc., Reno, NV (US)

(72) Inventors: Alexander Luke, Seattle, WA (US); Tyler Hobbs, Greenbrae, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/831,205

(22) Filed: Dec. 4, 2017

(65) Prior Publication Data

US 2019/0171762 A1    Jun. 6, 2019

(51) Int. Cl.
*G06F 3/16*   (2006.01)
*G06F 16/68*   (2019.01)
(Continued)

(52) U.S. Cl.
CPC .......... *G06F 16/637* (2019.01); *G06F 3/165* (2013.01); *G06F 16/635* (2019.01);
(Continued)

(58) Field of Classification Search
CPC ............... G06F 3/165; G06F 17/30772; G06F 17/30766; G06F 17/30749;
(Continued)

(56) References Cited

U.S. PATENT DOCUMENTS

| | | | |
|---|---|---|---|
| 6,588,015 B1 * | 7/2003 | Eyer | H04H 20/106 725/89 |
| 7,028,082 B1 * | 4/2006 | Rosenberg | H04H 60/02 707/999.104 |

(Continued)

FOREIGN PATENT DOCUMENTS

WO    2014/015110    1/2014

OTHER PUBLICATIONS

International Search Report and Written Opinion issued in International Application No. PCT/US18/62874 dated Feb. 26, 2019.
(Continued)

*Primary Examiner* — Jesse A Elbin
(74) *Attorney, Agent, or Firm* — Hogan Lovells US LLP

(57) ABSTRACT

In various embodiments, an audio streaming service may provide a plurality of channels. On a particular channel, different types of content can be streamed to audio devices connected to that channel, including channel content, group content, and individual content. Channel content refers to same content that is streamed to all of the audio devices that are connected to the channel. Group channel refers to content that is selected for subgroups of the devices, and individual content refers to content that is selected for an individual device. Channel content may be transmitted to all the devices, then a period of group or individual content is provided, and then the devices are synced back into receiving the same channel content during a syncing window. Listeners can also interact with the content, such as skipping songs or adding songs to their personal collection.

20 Claims, 14 Drawing Sheets

(51) Int. Cl.
*H04H 60/06* (2008.01)
*H04H 60/12* (2008.01)
*H04H 60/33* (2008.01)
*H04H 60/35* (2008.01)
*H04H 60/46* (2008.01)
*H04H 60/61* (2008.01)
*G06F 16/635* (2019.01)
*G06F 16/638* (2019.01)

(52) U.S. Cl.
CPC ............ *G06F 16/639* (2019.01); *G06F 16/68* (2019.01); *H04H 60/06* (2013.01); *H04H 60/35* (2013.01); *H04H 60/46* (2013.01); *H04H 60/61* (2013.01); *G06F 16/686* (2019.01); *H04H 60/12* (2013.01); *H04H 60/33* (2013.01); *H04H 2201/19* (2013.01); *H04H 2201/20* (2013.01)

(58) Field of Classification Search
CPC ........ G06F 17/30761; G06F 17/30752; H04H 60/06; H04H 60/07; H04H 60/12; H04H 60/33; H04H 60/35; H04H 60/45; H04H 60/46; H04H 60/49; H04H 60/51; H04H 60/52; H04H 60/61; H04H 60/63; H04H 60/65; H04H 60/66; H04H 60/68; H04H 60/70; H04H 60/73
USPC .......................................................... 700/94
See application file for complete search history.

(56) References Cited

U.S. PATENT DOCUMENTS

| | | | |
|---|---|---|---|
| 8,428,621 B2* | 4/2013 | Vorbau | G06F 17/30749 455/456.3 |
| 9,408,996 B2* | 8/2016 | Pompilio | A61M 21/02 |
| 2003/0236843 A1* | 12/2003 | Weber | G06Q 30/02 709/206 |
| 2004/0237759 A1* | 12/2004 | Bill | G06F 17/30017 84/668 |
| 2008/0101765 A1* | 5/2008 | Lee | H04N 21/4263 386/213 |
| 2008/0242221 A1 | 10/2008 | Shapiro | |
| 2013/0073632 A1 | 3/2013 | Fedorov | |
| 2016/0337059 A1* | 11/2016 | Nehls | H04H 20/18 |
| 2017/0124664 A1 | 5/2017 | Savenok | |
| 2017/0149711 A1 | 5/2017 | Shaw | |
| 2017/0180438 A1 | 6/2017 | Persson | |

OTHER PUBLICATIONS

Non-Final Rejection issued in U.S. Appl. No. 15/882,741 dated Aug. 13, 2018.
Notice of Allowance issued in U.S. Appl. No. 15/882,741 dated Jan. 11, 2019.

\* cited by examiner

| Classic Rock Channel Current Listeners ||||
|---|---|---|---|
| 302 | 304a | 304b | 304c |
| Device | Location | Interest | Other Attributes |
| Device 1 | Seattle | Artist A | ••• |
| Device 2 | Austin | Artist B | ••• |
| Device 3 | Miami | Artist A | ••• |
| Device 4 | NYC | Artist C | ••• |
| Device 5 | Boston | Artist D | ••• |
| Device 6 | Seattle | Artist A | ••• |
| Device 7 | NYC | Artist D | ••• |
| Device 8 | Houston | Artist A | ••• |
| Device 9 | NYC | Artist C | ••• |
| ⋮ | | | |
| Device *n* | Seattle | Artist B | ••• |

FIG. 3A

STREAMING RADIO WITH PERSONALIZED CONTENT INTEGRATION

BACKGROUND

Terrestrial radio technology has been a prominent form of audio content distribution and entertainment for the last century, and is still currently used to delivery content such as many genres of music and talk shows spanning topics such as sports and news. Although many other forms of audio content distribution have become available, such as personal digital music collections and Web based streaming, many listeners still enjoy the conventional radio experience as it provides a sense of discovery, community, and interactivity. Additionally, a live radio host can introduce new songs, make announcements, tell stories, and provide other fresh content. However, conventional radio lacks the ability to obtain profiles of listeners in real time (e.g., specific tastes and preferences), and is limited to broadcasting on specific frequencies, which means all devices tuned to that frequency receive the same content. Thus, although listeners enjoy the shared-experience and community aspects of conventional radio, it lacks the ability to support a more personalized experience that may further improve the user experience.

BRIEF DESCRIPTION OF THE DRAWINGS

Various embodiments in accordance with the present disclosure will be described with reference to the drawings, in which:

FIG. 3A illustrates an example representation of profiles of devices connected to a content channel, in accordance with various embodiments of the present disclosure.

DETAILED DESCRIPTION

Figure 1:
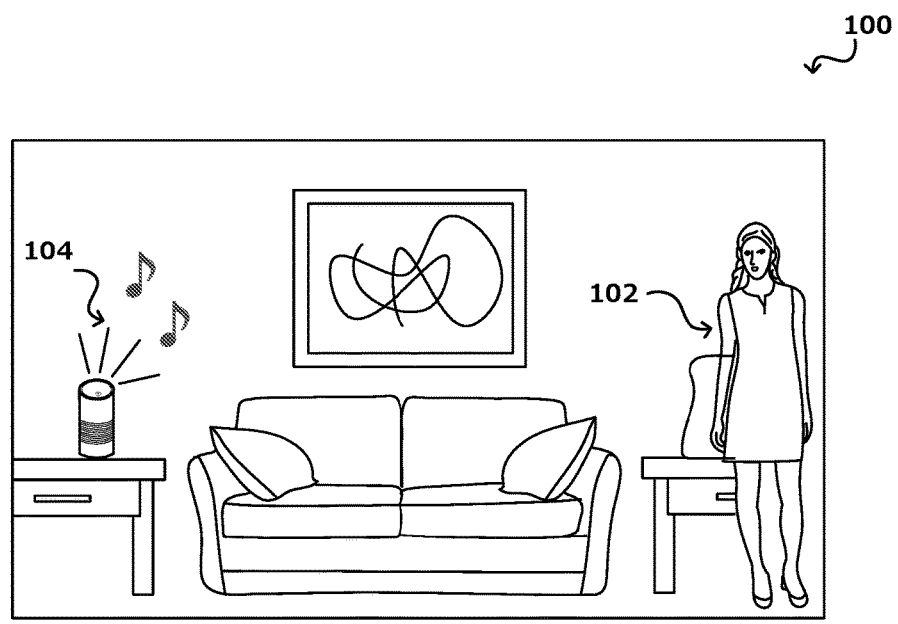
FIG. 1 illustrates an example scenario of a user listening to an audio playback device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for audio content distribution In particular, various embodiments are directed to interactive audio streaming technology that provides the benefits of conventional radio, such as shared community experience, live hosts, music discovery, and interactivity with added content personalization and user control.

In various embodiments, an audio streaming service may provide a plurality of channels for streaming various types of content, such as music, news, and sports. A users may access A plurality client device may connect to one of the channels via a network such as the Internet to play content streaming on that channel. On a particular channel, different types of content can be streamed to audio devices connected to that channel, including channel content, group content, and individual content. Channel content refers to same content that is streamed to all of the audio devices that are connected to the channel. For example, for a music channel, channel content may include songs or host announcements that are streamed to all devices on the channel, projecting the feel of traditional radio.

Group content refers to content that is streamed only to a subset of the audio devices that are connected to the channel. In some embodiments, the audio devices connected to the channel may be segmented into multiple groups, with each group receiving different content selected specifically for that group. The devices may be grouped based on various attributes of profiles associated with the devices. For example, the devices may be grouped based on geographic region, affinity for certain artists, or other attributes. In an example scenario, the devices connected to the channel may be segmented into a first group of devices that are associated with a strong affinity for a first artist, a second group of devices that are associated with a strong affinity for a second artist. Thus, songs selected for fans of the first artist may be streamed to the first group of devices, songs selected for fans of the second artist may be streamed to the second group. Individual content refers to content that is streamed to an individual device connected to the channel. Individual content streamed to a device may be selected based on specific preferences or affinities associated with that device.

During a certain streaming period (e.g, an hour of programming on a certain channel), a device may play a period of channel content, a period of group content, and a period of individual content. For example, channel content may be streamed to all the devices for a certain duration, then personalized content (i.e., grouped content and/or individual content) is streamed to the devices, and then the devices are synced back into all receiving the channel content. In some embodiments, channel content may be played on all of the devices at around the same time, such as to simulate the shared experience of traditional radio. More specifically, streaming of the channel content to each of the devices may be synced to a certain syncing window, such that channel content is streamed to each of the devices at some point within the syncing window. In one example, the channel content is streamed to all of the devices at the same time. In another example, the channel content is streamed to the devices at various offsets, such as a few seconds or minutes apart. This offset may occur when personalized content previously streamed to the devices (e.g., group content or individual content) may have different durations and thus end at different times. Accordingly, the channel content streamed to the devices following such content begins at different times, respectively. Thus, content for each of the plurality of devices on a channel can be scheduled accordingly to provide the devices with some shared channel content as well as some personalized content, bringing together the community experience of traditional radio with a more targeted content.

In various embodiments, users listening to a channel of the above described audio streaming service may provide inputs to alter the content being played, such as requesting to skip a song, requesting a specific song or music type, among others. Such user inputs may alter the content scheduled for the particular device and may cause the content schedule to be updated in real time. For example, such user input may cause certain content in the schedule to be replaced with other content. In some embodiments, the user input may be processed and applied to the channel content, group content, or individual content. In an example scenario, a critical number of user inputs (e.g., song skips and requests) and implicit preferences learned from the user inputs may cause a prompt or recommendation to switch to a different channel on the streaming service that may be suitable for the user and elicit fewer requests for content change.

Various other features and application can be implemented based on, and thus practice, the above described technology and presently disclosed techniques. Accordingly, approaches in accordance with various embodiments provide an advancement in digital content distribution systems. In particular, approaches described herein enable the distribution of common content to a large number of client devices while integrating personalized content as well. This is in in part made possible by the technology's ability to access data (e.g., profiles, attributes) associated with the listeners by way of the respective client devices. Additionally, various embodiments also provide an improvement in computing systems by improving their ability to provide more targeted and precise content through machine-based learning from user feedback, such as in the form of user interactions with content. Various other applications, processes, and uses are presented below with respect to the various embodiments, each of which improves the operation and performance of the computing device(s) on which they are implemented.

FIG. 1 illustrates an example scenario 100 of a user 102 listening to an audio playback device 104, in accordance with various embodiments. Although a voice communications device (e.g., an Amazon Echo) is illustrated, it should be understood that the device 104 may be various other types of electronic devices that are capable of outputting audio and which have audio playback controls. These devices can include, for example, speakers, receivers, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others. In the example scenario 100 of FIG. 1, the audio playback device 104 is outputting audio, such as music. In some embodiments, the audio playback device 104 may also include a voice communications component and voice-enabled inputs.

As will be described further herein, such devices may utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 102 can speak a request within an environment where the device 104 is located. The request may be any question, inquiry, instruction, phrase, or other set of one or more words/sounds. For example, the user may say, "Wakeword, play "Yellow Submarine". In this example, the word "Wakeword" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the device 104. Persons of ordinary skill in the art will recognize, however, that the one or more microphones may alternatively be located on a separate device in communication with the device 104. In some embodiments, after the wakeword is detected, the device 104 may begin interpreting/analyzing audio input data until no more speech is detected. In general, the device 104 constantly listens for the wakeword and is otherwise inactive.

Once the wakeword is recognized, the device 104 switches from a passive mode to an active mode. It should be noted that the wakeword does not have to be the first word or sound in a given sentence or request. In this example, the audio data comprising a request is sent over a network (e.g., the Internet) to a destination such as a resource provider environment (e.g., a cloud computing environment). As discussed further herein, resource provider environment may comprise various servers, virtual machines, services, applications, and/or processes such as those related to automatic speech recognition, natural language understanding, text-to-speech functionality, and other applications. In addition, in various embodiments resource provider environment may also comprise a music listening service (e.g., an online music service, an online radio station, etc.) or be in communication with a music listening service such that audio control commands and/or command contexts may be performed on music stored at or available to the music listening service. In other embodiments, music may be stored at or available to the audio playback device 104 that is capable of receiving and acting on commands.

Figure 2:
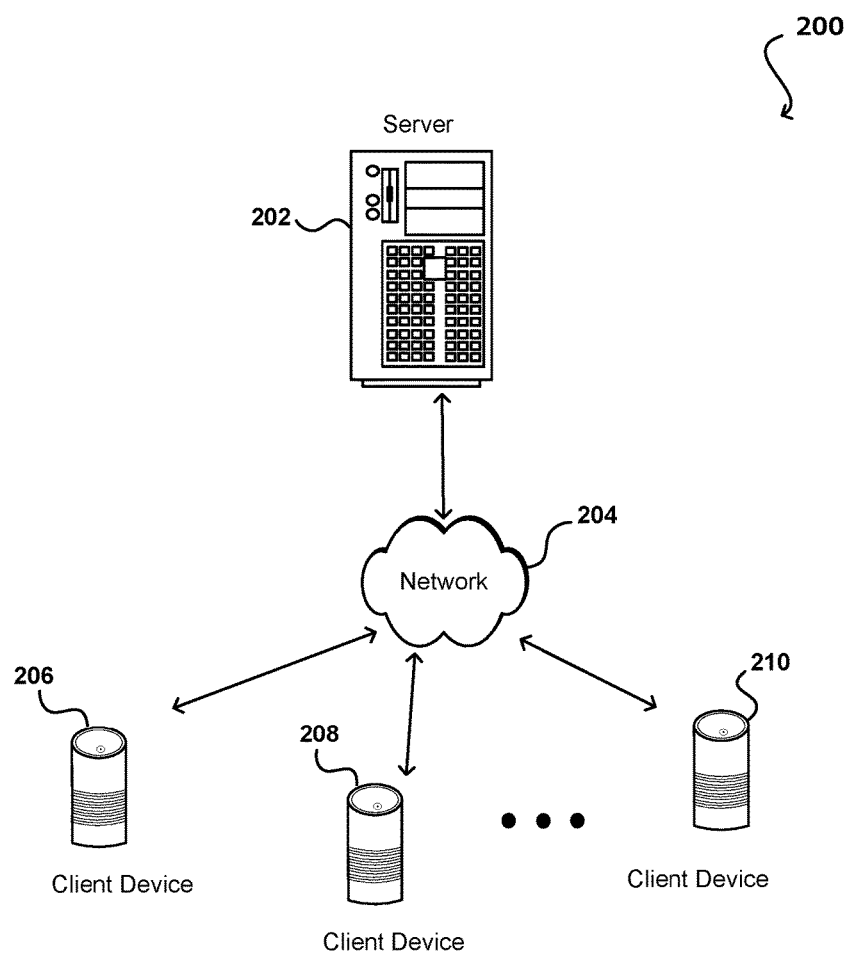
FIG. 2 illustrates an example of a networked computing system for content streaming, in accordance with various embodiments of the present disclosure.

FIG. 2 illustrates an example of a networked computing system 200 for content streaming In this example, a server 202 (or a plurality thereof), such as at a resource, service, or content provider can transmit content or data (e.g., audio data) to one or more client devices 206, 208, 210 such that audio can be rendered and played at the client devices 206, 208, 210. Client devices 206, 208, 210 include devices through which a user can watch, listen to, read, or otherwise interact with content, and include at least one form of input such as a keyboard, a touchscreen, a voice communications component such as a microphone, and at least one form of output such as a display or speaker. The client devices 206, 208, 210 can include various computing devices such as speakers, receivers, smart phones, tablet computers, wearable computers (e.g., smart glasses or watches), desktop or notebook computers, and the like. The client devices 206, 208, 210 can communicate with the server 202 over at least one network 204, such as the Internet, a cellular network, a local area network (LAN), an Ethernet, Wi-Fi, or a dedicated network, among other such options, such that the client devices 206, 208, 210 can communicate with the server 202. In various embodiments, the server 202 may represent an audio streaming service capable of streaming data to the client device 206, 208, 210, wherein it is rendered into audio. The audio streaming service may provide a plurality of channels for streaming various types of content, such as music, news, and sports. The client devices 206, 208, 210 may connect to one of the channels via the network such as the Internet to play content streaming on that channel. On a particular channel, different types of content can be streamed to audio devices connected to that channel, including channel content, group content, and individual content. Thus, the client devices 206, 208, 210 may receive and play the same content at certain times and personalized content at other times, thereby integrating more personalized content into a community driven experience.

FIG. 3A illustrates an example representation 300 of profiles of devices connected to a content delivery channel, in accordance with various embodiments. In this example, a plurality of client devices are connected to a channel of a streaming service. The channel, or content provider associated with the channel may receive respective profiles 302 associated with client devices, in which the profiles include various attributes 304 associated with the client devices. The attributes 304 of a client device may includes a wide rage of data, such as a geographic location 304a or region of the client device, an interest 304b, such as an affinity for a certain artist and type of music. Other attributes 304c may include additional interests that may dictate what type of content that respective listener might like, bio-data such as gender and age, historic interaction or behavior data such as usage data and user interactions or responses to certain content, and the like. In some embodiments, a client device may be associated with a user account, which provides some of the attributes 304, such as those that are associated with the user rather than dependent on the device used to access the streaming service. Other attributes 304 may be determined based on the device rather than the user account, such device type, current location, and the like.

The profile 302 of a client device may include a large amount of data that can be used to determine content that may be favorable to the respective listener. The data may include user-designated attributes (e.g., preferences) or learned attributes. For example, a learned attribute may include an affinity for a certain sub-genre of music or particular sound that is determined based on the songs that the user specifically request, songs that the user skips, and other such behavior, without such an affinity being explicitly expressed by the user. The attributes associated with the client devices can be used to segment the client devices into groups and for determining the group content of the respective groups, as well as the individual content for the respective individual client devices. In the example channel of FIG. 3A, different types of content can be streamed to audio devices connected to that channel, including channel content, group content, and individual content, as respectively illustrated in FIGS. 3B, 3C, and 3D. In various embodiments, a certain streaming period (e.g., an hour of programming), a device may play a period of channel content, a period of group content, and a period of individual content. For example, channel content may be streamed to all the devices for a certain duration, then personalized content (i.e., grouped content and/or individual content) is streamed to the devices, and then the devices are synced back into all receiving the channel content.

In some embodiments, a single device may be associated with multiple user accounts or profiles. Thus, for those devices, the attributes may include a combination of the attributes of all the associated profiles or determined based on the attributes of the associated profiles. In some embodiments, multiple users may be associated with a single user account or device. Separate and/or combined profiles for the multiple users may be available. Thus, the personalized content may be selected for one, all, or a subset of the multiple users. In some embodiments, the current user of the device may be determined based on voice recognition, and the personalized content may be determined for the current user. In some embodiments, a voice command may request content personalized for one or more specific users, for example "Please play music for John and I". In this example, the system may be able to determine the use referred to by "John" and also be able to recognize the user referred to by "I" through voice recognition, and determine personalized content based on attributes associated with the two identified users.

Figure 3B:
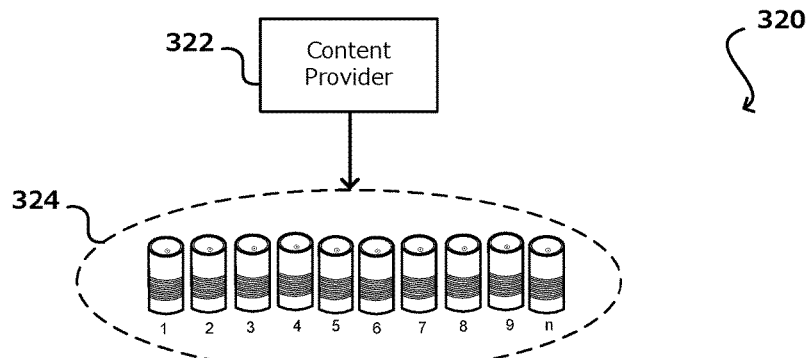
FIG. 3B illustrates an example representation a first aspect of a content delivery scheme, in accordance with various embodiments of the present disclosure.

FIG. 3B illustrates an example representation 320 a first aspect of a content delivery scheme, in accordance with various embodiments. Specifically, FIG. 3B illustrates the delivery of channel content from a content provider 322 to all devices 324. Channel content refers to same content that is streamed to all of the audio devices that are connected to the channel. For example, for a music channel, channel content may include songs or host announcements that are streamed to all devices on the channel, projecting the feel of traditional radio. In some embodiments, channel content may be played on all of the devices 324 at around the same time, such as to simulate the shared experience of traditional radio. More specifically, streaming of the channel content to each of the devices 324 may be synced to a certain syncing window, such that channel content is streamed to each of the devices at some point within the syncing window. In one example, the channel content is streamed to all of the devices 324 at the same time. In another example, the channel content is streamed to the devices at various offsets, such as a few seconds or minutes apart. This offset may occur when personalized content previously streamed to the devices (e.g., group content or individual content) may have different durations and thus end at different times. Accordingly, the channel content streamed to the devices following such content begins at different times, respectively. In various embodiments, the channel content includes a data stream of live content, pre-recorded content, listener-generated content received through the first client device, or a combination thereof. For example, a host may record an announcement (e.g., "DJ break") or other commentary to be transmitted as channel content. The recording may be saved and transmitted to client devices at respective times within the syncing window. In some embodiments, or for some devices, the recording may be streamed to the devices immediately or as it is recorded, thereby providing live content. In some embodiments, a client device may record a length of audio of a listener, such as an announcement or "shout-out", transmit that audio to the server, where it is streamed to other client devices. This further provides a community experience, allowing listeners to interact not only with the provider, but also with each other. One or more songs may also be selected to be channel content and transmitted to the client devices accordingly.

Figure 3C:
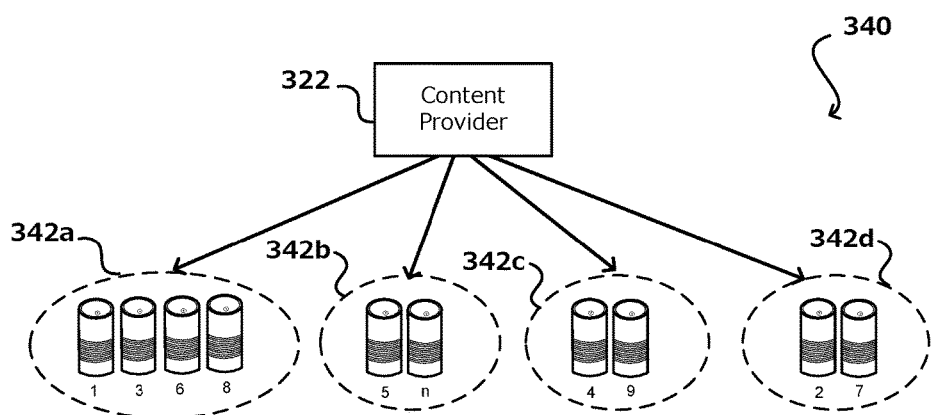
FIG. 3C illustrates an example representation a second aspect a content delivery scheme, in accordance with various embodiments of the present disclosure.

FIG. 3C illustrates an example representation 340 a second aspect a content delivery scheme, in accordance with various embodiments. Specifically, FIG. 3C illustrates the delivery of group content from the content provider 322 to groups of devices 342a, 342b, 342c, 342d. Group content refers to content that is streamed only to a subset of the audio devices that are connected to the channel. In some embodiments, the devices connected to the channel may be segmented into multiple groups 342a, 342b, 342c, 342d, with each group receiving different content selected specifically for that group. The devices may be grouped based on various attributes of profiles associated with the devices. For example, the devices may be grouped based on geographic region, affinity for certain artists, or other attributes. In this example scenario, the devices connected to the channel may be segmented into four different groups 342a, 342b, 342c, 342d based on the "top artist" attribute associated with the devices. In another example, the devices can be grouped based on geographic region and the group content delivered to the respective groups can include announcements or commentary relevant to the respective geographic region. In some embodiments, groups may be determined based on a combination of attributes, such as "fans of The Beatles located on the west coast".

Figure 3D:
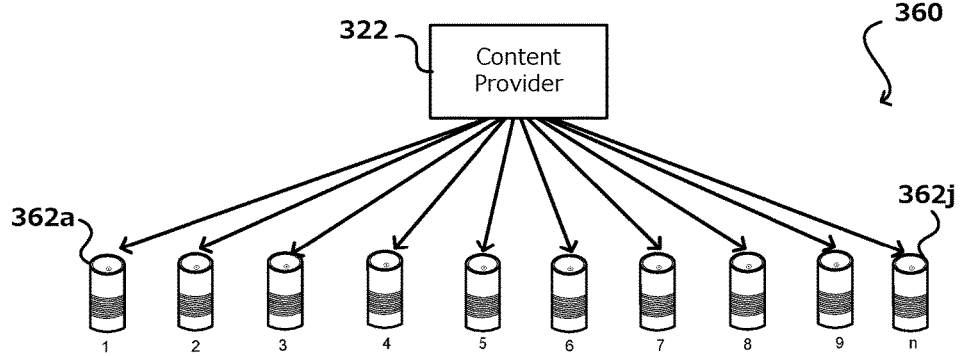
FIG. 3D illustrates an example representation a third aspect of a content delivery scheme, in accordance with various embodiments of the present disclosure.

FIG. 3D illustrates an example representation 360 a third aspect of a content delivery scheme, in accordance with various embodiments. Specifically, FIG. 3D illustrates the delivery of individual content from the content provider 322 to individual devices 362a-j. Individual content refers to content that is specifically selected for and streamed to an individual device connected to the channel. Individual content streamed to a device may be selected based on specific preferences or affinities associated with that device. The individual content is targeted to the user of the device and based on what the user may enjoy and interactive with. In some embodiments, although the individual content is independently selected for each device, the individual content provided to two or more of the individual devices 362a-j may coincidentally include the same content. In some embodiments, the personalized content provided to an individual device may be selected from a database of content associated with the channel or from a collection of content associated with a user account of the individual device.

Figure 4A:
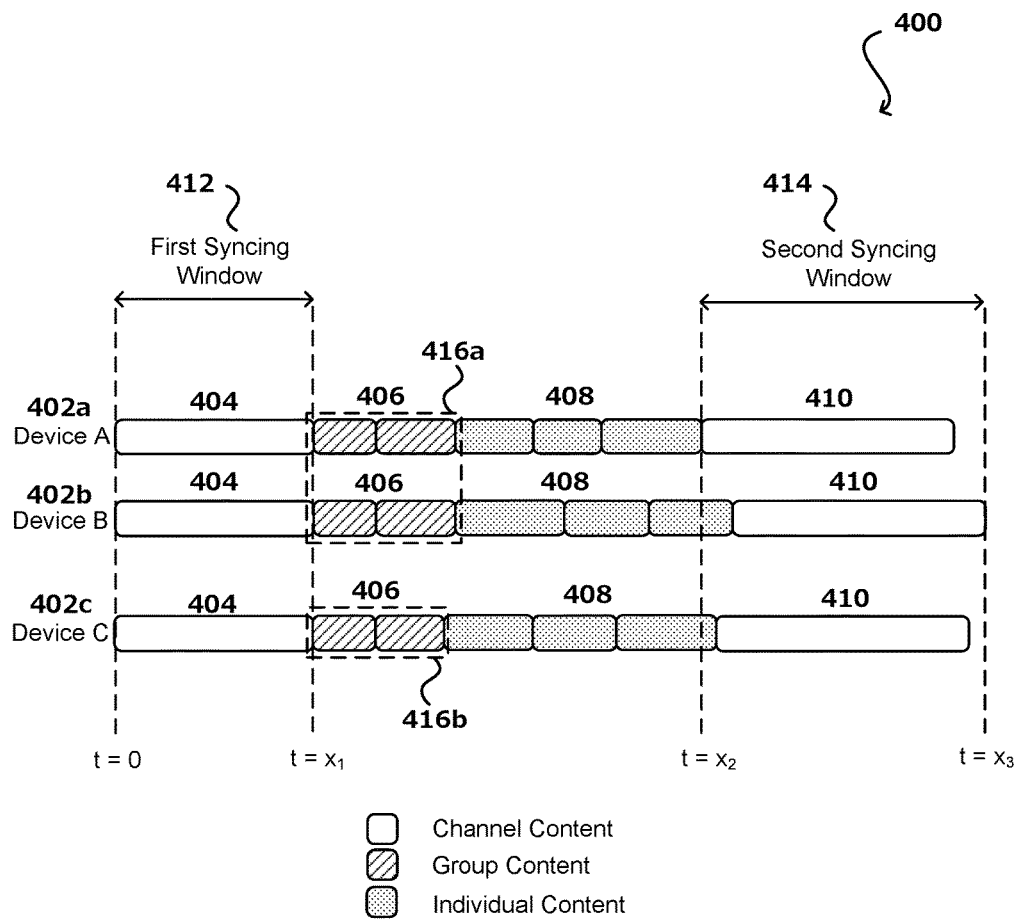
FIG. 4A illustrates an example of content scheduling, in accordance with various embodiments of the present disclosure.

FIG. 4A illustrates an example 400 of content scheduling, in accordance with various embodiments. In this example, and as discussed above, a certain streaming period (e.g., an hour of programming), a device may play a period of channel content, a period of group content, and a period of individual content. FIG. 4A illustrates such content schedules for a three example devices connected to a channel, device A 402a, device B 402b, and device C 402c. As illustrated, each of the devices receives a period of channel content 404, a period of group content 406, a period of individual content 408, and sync back to receiving another period of channel content 410. In this example, the three devices receive the first period of channel content 404 at the same time during a first syncing window 412, such as at the beginning of a broadcast. In various embodiments, the channel content includes a data stream of live content, pre-recorded content, or a combination thereof. For example, a host may record a "DJ break" introducing a new song, and the new song may following the introduction also as a part of the channel content broadcast to to all of the devices. In this example, group content 406 is provided to the client devices following the channel content 404.

In some embodiments, the group content 406, although containing different content for different groups of devices, may be provided to the client devices at the same time or at different times, offset from each other. In this example, device A 402a and device B 402b are in the same group and thus receive the same group content 416a, while device C 402c is in a different group and receives different content 416b than devices A 402a and B 402b. Following the group content, each device may receive individual content 408 selected specific for the respective individual device. Thus, the individual content 408 for each device may be different. In some embodiments, individual content 408 and group content 406 may be played in any order, and in different order on different devices. Eventually, all of the devices may be synced back to all receiving the same channel content (i.e., a second period of channel content 410) during a second syncing window 414. In this example, the second period of channel content 410 is streamed to the devices at various offsets, such as a few seconds or minutes apart. This offset may occur when personalized content previously streamed to the devices (e.g., group content or individual content) may have different durations and thus end at different times. Accordingly, the channel content streamed to the devices following such content begins at different times, respectively.

Figure 4B:
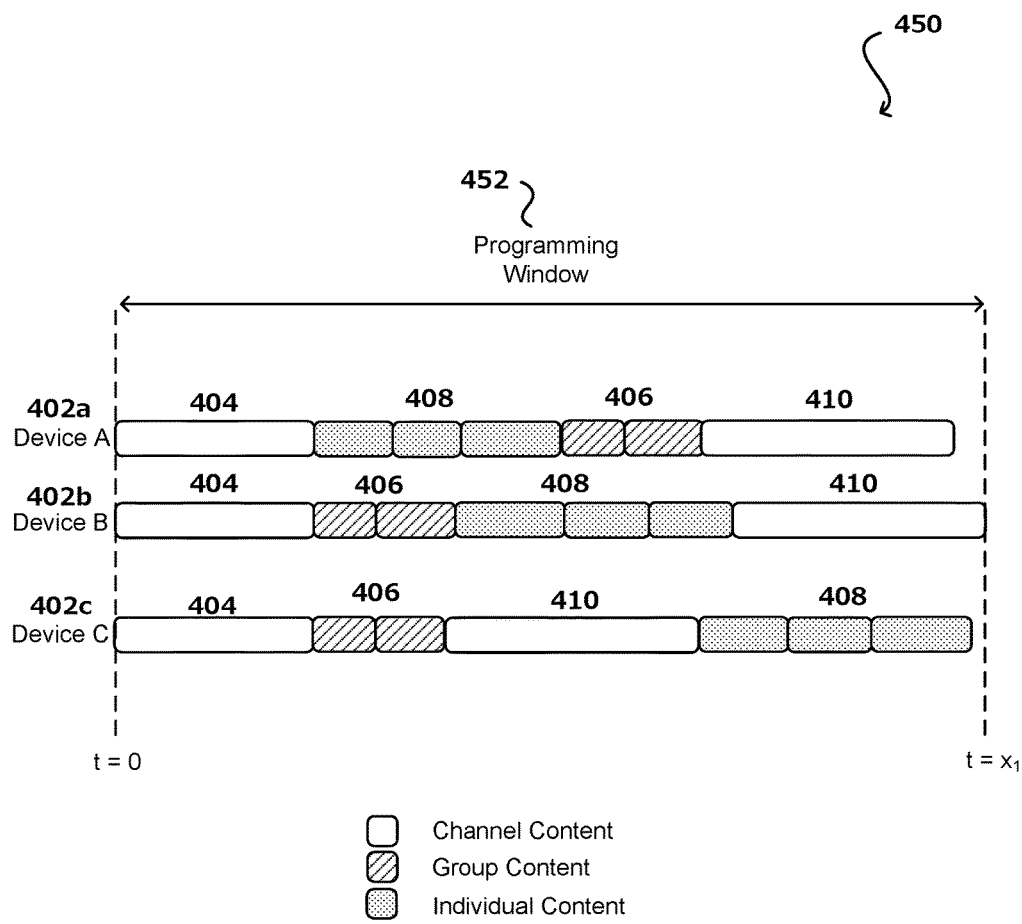
FIG. 4B illustrates another example of content scheduling, in accordance with various embodiments of the present disclosure.

FIG. 4B illustrates another example 450 of content scheduling, in accordance with various embodiments. In this example, the channel content, group content, and individual content may be transmitted to the individual devices 402a, 402b, 402c at various times and in different orders during a programming window 452. For example, for Device A 402a, the content ordering is channel content 404, then individual content 408, then group content 406, then more channel content 410. Meanwhile, Device B 402b receives channel content 404, group content 406, individual content 408, and then more channel content 410. Device C 402c may receive channel content 404, group content 406, more channel content 410, and then individual content 408. A programming window 452 may be any amount of time for which content is scheduled. For example, a programming window 452 may be an hour of content, a day of content, etc.

Figure 5:
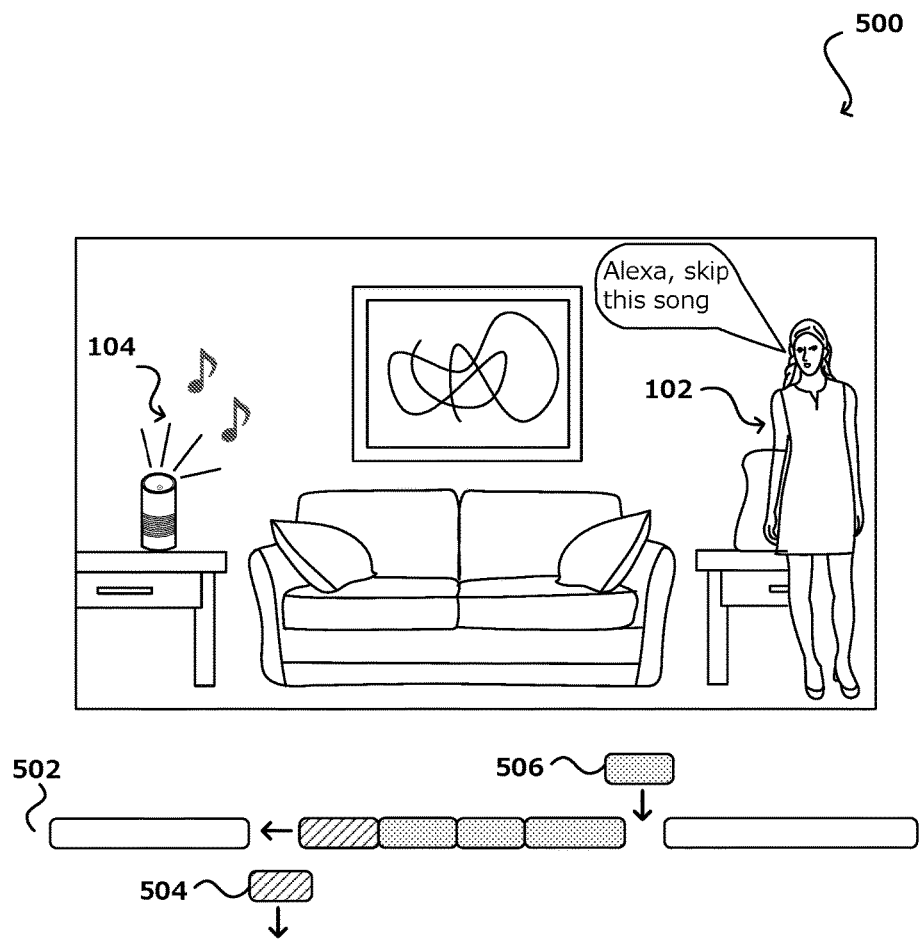
FIG. 5 illustrates an example of adjusting a content schedule based on user input, in accordance with various embodiments of the present disclosure.

FIG. 5 illustrates an example 500 of adjusting a content schedule based on user input, in accordance with various embodiments. In this example scenario, an audio playback device 104 (i.e.e.g, client device) is outputting audio, such as music. The audio playback device 102 is voice communications enabled, meaning that it can received user inputs via voice. In some other embodiments, the device 104 does not need to have voice communications capabilities. Rather, in such cases, the user input can be received via other input methods such as physical button, touchscreens, or other input peripherals. In this example, a user 102 may say a command, such as "skip this song". This phrase is recorded by the device 104 and processed at the content provider (e.g., streaming service) and interpreted as a command to skip the presently playing song or content. As illustrated in a representation of the device schedule 502, the skipped song 504 will be removed from the schedule and replaced. For example, in some embodiment, the remaining scheduled content may be pushed up in queue and a new piece of content 506 (e.g., song) may be added to the content schedule to replace the skipped content. In the illustrated embodiment, the new content is added to be played before the channel content such that the channel content can still be played in a similar time slot as was previously scheduled, in an effort to stream the channel content for all devices at roughly the same time, or within a syncing window. In other embodiments, the larges portions of the scheduled content may be replaced. In some embodiments, user's can provide inputs that change the current content being played at any time, whether its during channel content, group content, or individual content. In any case, the content schedule will be updated to accommodate the user input in a way that drives the schedule to sync to the next syncing window for broadcast of channel content. Thus, users can have a degree of control over the music being played while still being able to enjoy the shared community feel of traditional radio. In various embodiments, if a user makes too many requests, such as above a threshold number of "skips", the user may be prompted with a recommendation for another, more suitable channel. The prompt may be provided as an audio prompt, and the user can answer confirm or reject the recommendation using a voice response.

Figure 6:
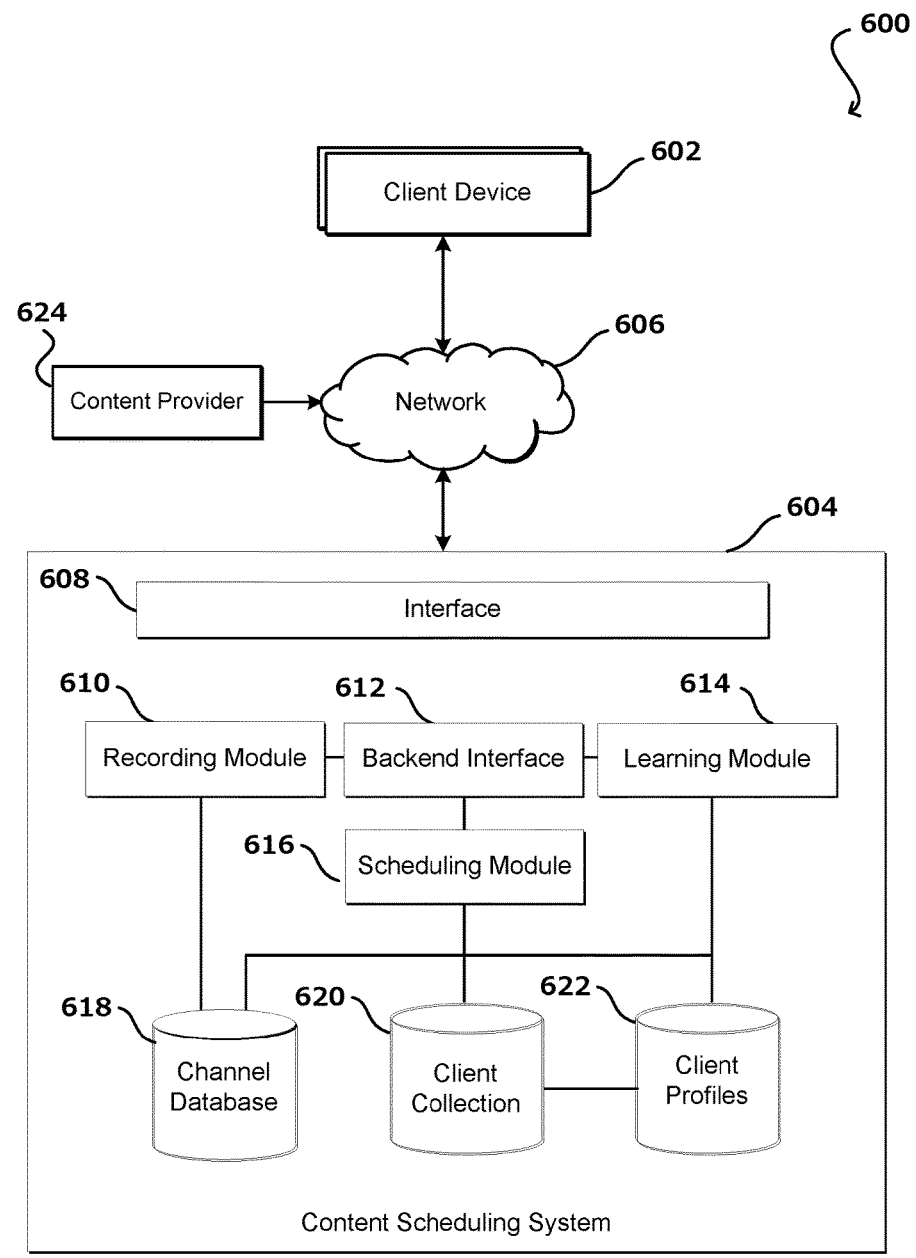
FIG. 6 illustrates an example computing system for content selection and delivery, in accordance with various embodiments of the present disclosure.

FIG. 6 illustrates an example computing system 600 for streaming radio with integrated personalized content, in accordance with various embodiments of the present disclosure. In various embodiments, a system 600 may enable a client device 602 to receive content, such as audio content, from a content scheduling system 604. The device client 602 may access a content provider 624, such as an audio streaming service or other web platform or service providing content to request audio content associated with a streaming channel. In some embodiments, the content scheduling system 604 may be implemented at one or more servers at content provider 624 or at a separate service provider that performs the present function using content provided by the content provider. The content provider 624 or service provider may utilizes the content scheduling system 604 to schedule a combination of channel content and personalized content for each client device 602. In some other embodiments, the content scheduling system 604 may be implemented remote from the content provider 624, such that the content provider 624 provides data to the content scheduling system 604. In certain such cases, the content scheduling system 604 can either transmit the content back to the content provider 624 or directly to the client device 602. The client device 602 may represent a client-side computer device that includes any type of computing devices having network connectivity, including personal computers, tablet computers, smart phones, notebook computers, and the like. Multiple client devices 602 may be connected to the content scheduling system 604 via the network 606, and the content scheduling system 604 may provide individualized service to each client device 602, such as based on the type of client device. In some embodiments, the client device 602 may be a virtual device, Web program, or software application that can communicate with the content scheduling system 604 directly or over the network 606, making and receiving requests and calls, and sending and receiving data. The network 606 can include any appropriate network, such as the Internet, a local area network (LAN), a cellular network, an Ethernet, Wi-Fi, Bluetooth, radiofrequency, or other such wired and/or wireless network. The content scheduling system 604 can include any appropriate resources for performing the various functions described herein, and may include various servers, data stores, and other such components known or used for providing content from across a network (or from the cloud).

In various embodiments, the content scheduling system 604 may include functional and data aspects illustrated herein as an interface 608, a recording module 610, a back-end interface 612, a learning module 614, a scheduling module 616, a channel database 618, a client profiles database 620, and a client content database 622. One or more of the modules and databases described above may be implemented jointly or separated further into additional modules.

The interface face 608 can facilitate communications between the client device 602 and the content scheduling system 604. Requests received by the content scheduling system 604 can be received by the interface 608. Example requests may include a request for content (e.g., connecting to a channel), a request to skip content or otherwise change content, among others. The interface 608 may also provide outputs from the content scheduling system 604 to the client 602, such as channel content and personalize content for rendering at the client device as an audio output. The content scheduling system 604 may receive content (e.g., songs, announcements, shows) from the content provider 624 via the interface 608. The interface 608 may also include components such as specific application programming interfaces (APIs), load balancers, request and/or data routers, and the the like. The interface 608 may also facilitate communication with the content provider 602, whether local or remote.

The recording module 610 may enable a host to record content for live or delayed transmission to the client device 602. For example, the recording module 610 be used to record an introduction to a song or announcement. In some embodiments, the recording may be transmitted to some client devices 602 live as it is recorded, and transmitted to some other client devices 602 at a later point in time, such as after other content. In various embodiments, an entire show or segment can be recorded via the recording module 610 and transmitted live or scheduled after other content. The recording module 610 may be controlled at least in part through the back-end interface 612, which may be used by a host to initiate a recording session. The recorded content may be stored in the channel database 618 where it can be accessed by the scheduling module and scheduled along with other channel content and personalized content for a client device 602.

The back-end interface 612 may include a graphical interface that allows a host to control certain aspects of the content scheduling system 604. For example, the host can select content for the channel content and the personalized content through the back-end interface 612, as well as select various groupings for transmission of group content. For example, the host may select songs that all devices receive as channel content and make the selections as inputs to the back-end interface 612. The back-end interface 612 may also access the client profiles database 620 and display data regarding the client devices and/or the respective users currently connected to the channel. The host may see that there are a large number of listeners who are fans of a certain artist and also a large number of listeners who are fans of another artist, and group the client devices accordingly. The host can then select songs for the first group and different songs for the second group. The back-end interface 612 may provide many types of data regarding the devices/users currently connected to the channel and select content on the fly based on this data. The back-end interface 612 may also provide a means to receive inputs and communications from the client devices as well as track user behavior of the client devices. For example, the back-end interface 612 may show that many listeners are skipping a certain song, which may indicate that the song may not be a great fit for the channel or at least a subgroup of the channel. In another example, the back-end interface 612 may receive user responses to questions or prompts, such as answers to trivia questions, votes, feedback, and other interactive content, which may be received via voice communications captured by the client devices.

The learning module 614 may process data regarding user profiles, including attributes, interaction behaviors in response to certain content, and other user-content information to provide insight to predict what content certain users might enjoy. The learning module 614 may access the client profiles database to obtain data to analyze as well as write to the client profile database to add more attributes based on what has been learning. The learning module 614 may include machine learning models such as neural networks, clustering models, among others. For example, the learning module may utilize a particular user's interaction with a certain song or song type as training data to predict how that user might respond to certain other songs based on attributes of the songs. The learning module may detect patterns that reveal certain affinities that the user has (i.e., machine-learning affinities). Such learned attributes may be written to the profile of that user or their associated client device. The learning module 614 may provide suggestion to the host via the back-end interface. In some embodiments, the learning module may automatically select personalized content (e.g., group content, individual content) based on the user profiles.

The scheduling module 616 generates content schedules for each client device 602 connected to the channel. In various embodiments, the scheduling module takes the channel content, any group content that a client device is designated to receive, and any individual content that is selected for the client device and generate a content schedule for providing to the client device. For example, the scheduling module 616 may generate the content schedules illustrated in FIG. 4. In various embodiment, the scheduling module 616 is configured to schedule such content in a way such that personalized content is provided to the client devices, respectively, and the client devices eventually sync together to receiving channel content as approximately the same time, such as within a syncing window. The scheduling module and the learning module 614 may be integrated to select content items (e.g., songs) for the client devices based not only material content but also based on length of the content items in order to minimize the syncing window. The smaller the syncing window is, the more in sync the client devices are with respect to receiving the channel content.

In various embodiments, the content selected for channel content, group content, and individual content may come from the channel database 618 or the client content collection 622, which may be owned by the respective user. In an example of a music channel, the system 604 may check whether a song in the content schedule of a client device is already owned by the user or not. If the song is already owned, it can be played from the user's own collection 622, which in some embodiments may not incur a streaming instance. If the song is not owned by the user, it can be streamed from the channel database 618.

Figure 7:
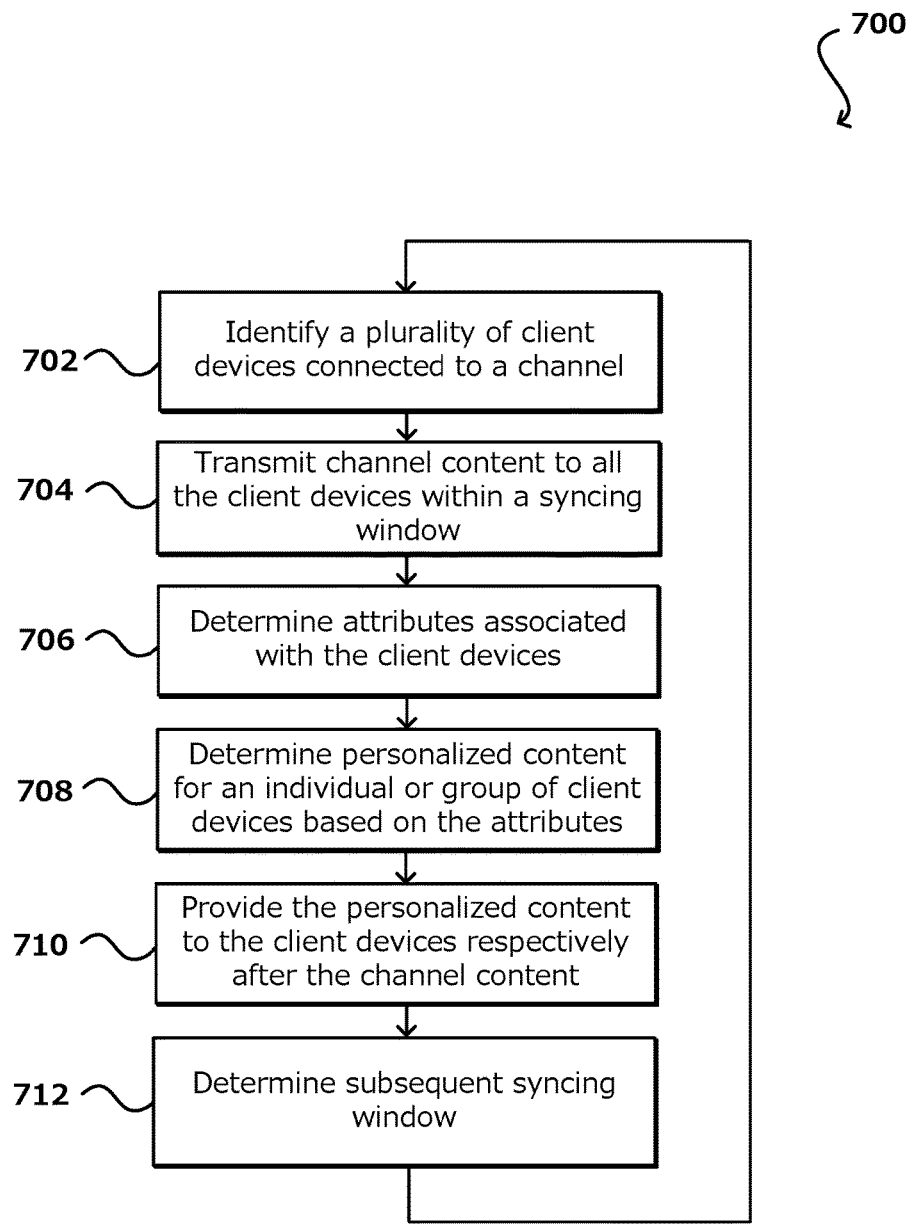
FIG. 7 illustrates an example process of content scheduling and delivery, in accordance with various embodiments of the present disclosure.

FIG. 7 illustrates an example process 700 of content scheduling and delivery, in accordance with various embodiments. It should be understood that, for any process discussed herein, there can be additional, fewer, or alternative steps performed in similar or alternative orders, or in parallel, within the scope of the various embodiments. In this example, a plurality of client devices that are connected to a channel of a streaming service or content provider are identified 702. The client devices may include audio playback devices or devices with audio playback capabilities. In some embodiments, a back-end interface may show a list or other representation of the client devices and/or their associated user accounts currently connected to said channel, including attributes and other metadata associated with the client devices. An example representation of such an interface is illustrated in FIG. 3A. Channel content may be transmitted 704 to all of the client devices connected to the channel within a syncing window. Channel content refers to same content that all devices connected to the channel receive. More specifically, streaming of the channel content to each of the devices may be synced to the syncing window, such that channel content is streamed to each of the devices at some point within the syncing window. In one example, the channel content is streamed to all of the devices at the same time. In another example, the channel content is streamed to the devices at various offsets, such as a few seconds or minutes apart. This offset may occur when personalized content previously streamed to the devices (e.g., group content or individual content) may have different durations and thus end at different times.

Attributes associated with the client devices can be determined 706, for example based on metadata of the client device itself or based on a user account. The attributes associated with an individual client device may include one or more user-defined or machine-learned affinities, geographic location, or historical interaction behaviors. Respective personalized content for the client devices can be determined 708 based on one or any combination of such attributes or other metadata. In some embodiments, the client devices may be segmented into various groups and each group may receive different content with the client devices within each group receiving the same content. In some embodiments, each of the client devices connected to the channel may independently receive personalized content individually selected for each client device. In some such cases, two or more client devices may coincidentally receive the same content. The personalized content is then provided 710 to the client devices, respectively. A subsequent syncing window can be determined 712 for transmitting additional channel content to all of the client devices. Since the personalized content provided 710 to the client devices may have different temporal lengths, the channel content is transmitted and payed at the client devices when the personalized content ends, which may occur at different times. Thus, a mix of both channel content and personalized content is delivered to the client devices.

Figure 8:
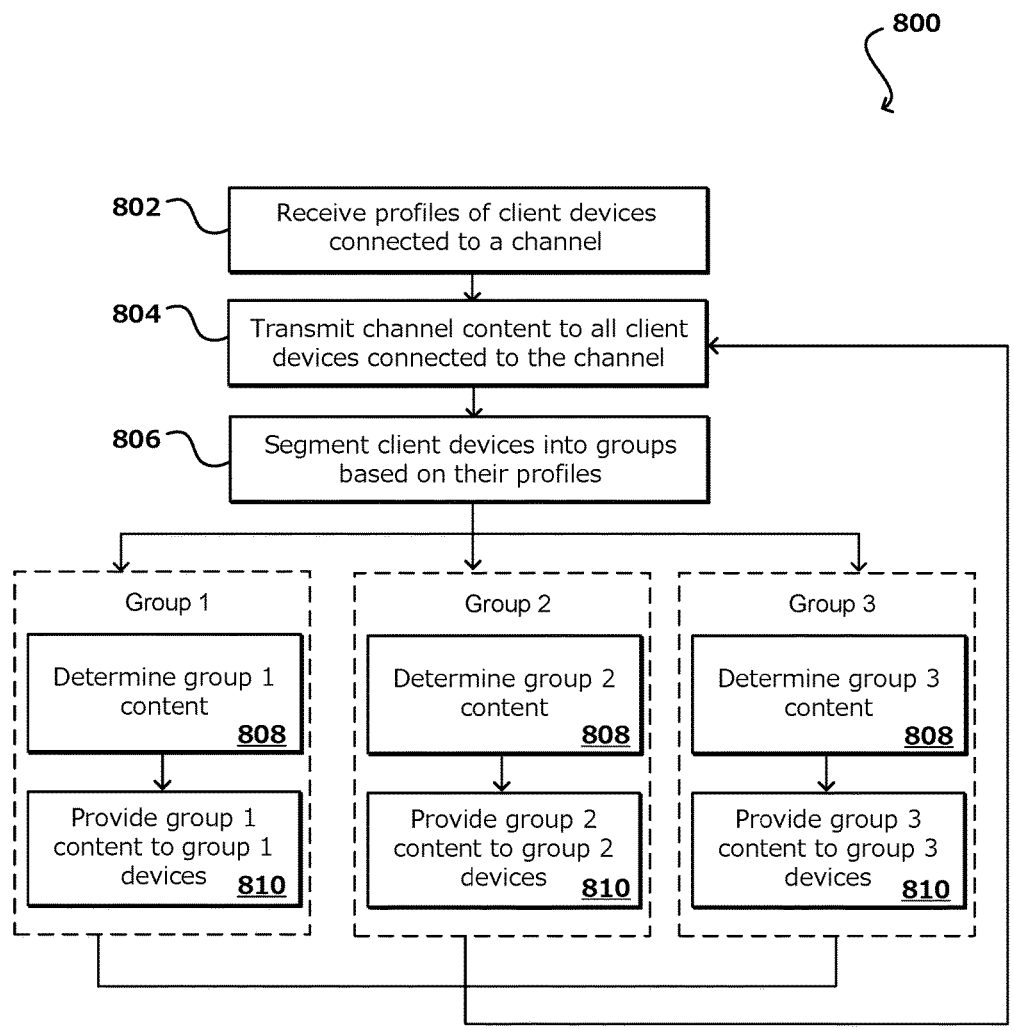
FIG. 8 illustrates an example process of content scheduling and delivery with device groupings, in accordance with various embodiments of the present disclosure.

FIG. 8 illustrates an example process 800 of content scheduling and delivery with device groupings, in accordance with various embodiments. In this example, profiles of client devices connected to a channel of a streaming content provider are received 802. For example, the profiles may be received from a database of user profiles. Channel content is transmitted 804 to all of the client devices connected to the channel. The client devices may be segmented 806 into a plurality of groups based on their profiles. For example, the client devices may be grouped by geographic regions. In this example, the client devices are segmented into three groups, and group content can be determined 808 for each group. The respective group content may be provided 810 to the groups of client devices. The group content for a first group may be different from group content for a second group, and different from group content for a third group. However, in some embodiments, the group content for two or more groups may coincidentally be the same. Subsequently, additional channel content may be transmitted 804 to all of the client devices connected to the channel regardless of grouping. The client devices may then be segmented into groups again. The devices may be grouped differently than previously grouped, such as based on different attributes of the profiles.

Figure 9:
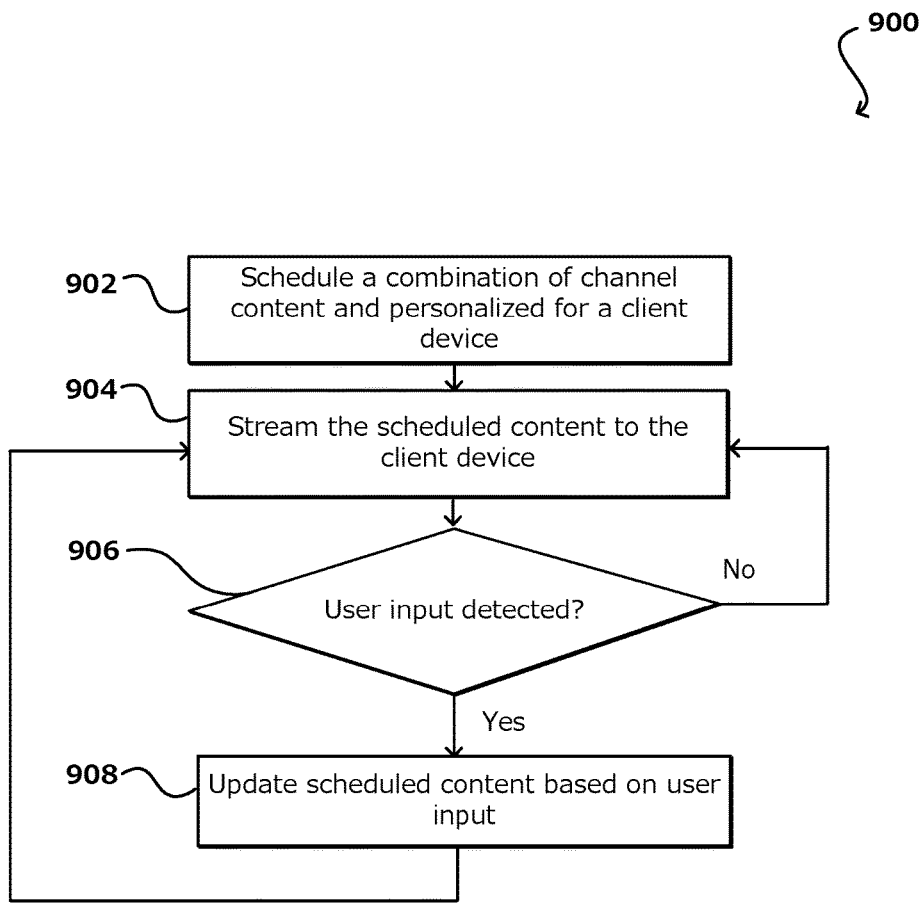
FIG. 9 illustrates an example process of content scheduling and delivery with user inputs, in accordance with various embodiments of the present disclosure.

FIG. 9 illustrates an example process 900 of content scheduling and delivery with user inputs, in accordance with various embodiments. In this example, a combination of channel content and personalized content is scheduled 902 for a client device connected to a channel of a content streaming service. This may be accomplished through various embodiments, some of which have been described herein. The scheduled content, which may include segments such as songs, may be streamed 904 to the client device. It can be determined 906 if a user input associated with the client device is received. In various embodiments, the user input includes a request to change the content being played on the client device. For example, the user input may include a request to skip a portion of content, such as a song, a request to play a particular type of content, such as a particular song or type of song. The user input may be a received in the form of a voice input and processed using natural language processing techniques. If a user input is not detected, the scheduled content continues to be streamed 904 to the client device. If at some point, a user input is detected, the scheduled content may be updated 908 based on the user input. For example, a skipped portion of content may be replaced with new content, or a requested content may replace the originally scheduled content. The updated scheduled content may be streamed 904 to the client device. In various embodiments, the user input may be received during a period of channel content or personalized content, and the updates are made in real-time in response to the user input.

Figure 10:
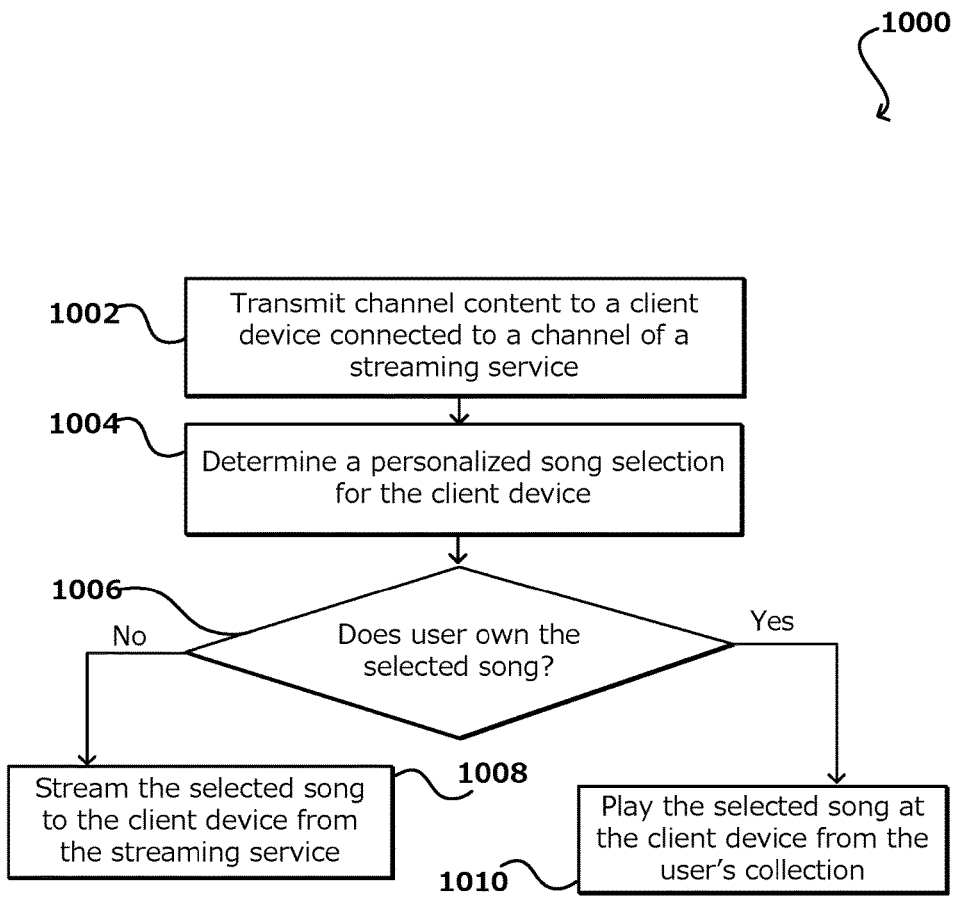
FIG. 10 illustrates an example process of content streaming utilizing user owned content, in accordance with various embodiments of the present disclosure.

FIG. 10 illustrates an example process 1000 of content streaming utilizing user owned content, in accordance with various embodiments. In this example, channel content may be transmitted 1002 to a client device connected to a channel of a streaming service, channel content also being transmitted to other client devices also connected to the channel within a syncing window. In this example, a personalized song selection may be determined 1004 for the client device, such as based on attributes associated with the device. In some embodiments, the client device may be tied to a user account. It can then be determined 1006 whether the user owns the selected song based on data of the user account. If the user does own the selected song, then the song can be played 1010 from the user's collection and playing of the song would not count as a streaming instance. If the selected song is not owned by the user, the song may be streamed 1008 to the client device from the streaming service. Thus, the songs played at the client device may come from the user's own collection or from the streaming service provider.

Figure 11:
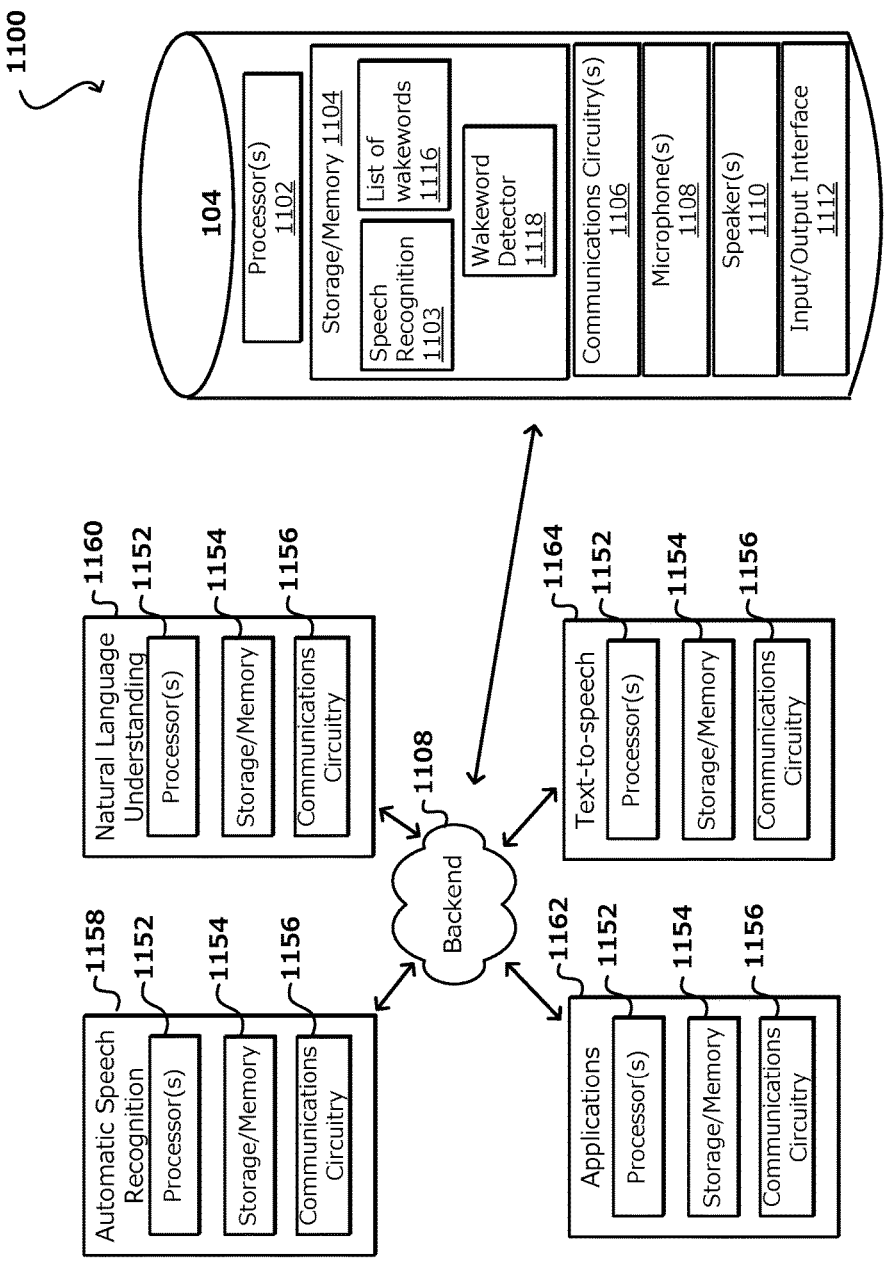
FIG. 11 illustrates an example implementation device, in accordance with various embodiments of the present disclosure.

FIG. 11 is another example environment 1100 for implementing aspects in accordance with various embodiments. In this example, voice-enabled communications device 102, in some embodiments, may correspond to any type of electronic device capable of being activated in response to detecting a specific sound. Voice-enabled communications device 102 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled communications device 102 may be relatively simple or basic in structure such that no mechanical input option(s) (e.g., keyboard, mouse, trackpad) or touch input(s) (e.g., touchscreen, buttons) may be provided. For example, voice-enabled communications device 102 may be capable of receiving and outputting audio, and may include power, processing capabilities, storage/memory capabilities, and communication capabilities. Voice-enabled communications device 102 may include a minimal number of input mechanisms, such as a power on/off switch, however primary functionality, in one embodiment, of voice-enabled communications device 102 may solely be through audio input and audio output. For example, voice-enabled communications device 102 may listen for a wakeword by continually monitoring local audio. In response to the wakeword being detected, voice-enabled communications device 102 may establish a connection with backend server 1008, send audio input data to backend server 1008, and await/receive a response from backend server 1008. In some embodiments, however, non-voice-enabled devices may also communicate with backend server 1008 (e.g., push-to-talk devices). Voice-enabled communications device 102 may include one or more processors 1102, storage/memory 1104, communications circuitry 1106, one or more microphones 1108 or other audio input devices (e.g., transducers), one or more speakers 1110 or other audio output devices, as well as an optional visual input/output ("I/O") interface 1112. However, one or more additional components may be included within voice-enabled communications device 102, and/or one or more components may be omitted. For example, voice-enabled communications device 102 may include a power supply or a bus connector. As another example, voice-enabled communications device 102 may not include a visual I/O interface. Furthermore, while multiple instances of one or more components may be included within voice-enabled communications device 102, for simplicity only one of each component has been shown. Processor(s) 1102 may include any suitable processing circuitry capable of controlling operations and functionality of voice-enabled communications device 102, as well as facilitating communications between various components within voice-enabled communications device 102. In some embodiments, processor(s) 1102 may include a central processing unit ("CPU"), a graphic processing unit ("GPU"), one or more microprocessors, a digital signal processor, or any other type of processor, or any combination thereof. In some embodiments, the functionality of processor(s) 1102 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 1102 may include its own local memory, which may store program modules, program data, and/or one or more operating systems. However, processor(s) 1102 may run an operating system ("OS") for voice-enabled communications device 102, and/or one or more firmware applications, media applications, and/or applications resident thereon. Storage/memory 1104 may include one or more types of storage mediums such as any volatile or non-volatile memory, or any removable or non-removable memory implemented in any suitable manner to store data on voice-enabled communications device 102. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 1104 may be implemented as computer-readable storage media ("CRSM"), which may be any available physical media accessible by processor(s) 1102 to execute one or more instructions stored within storage/memory 1104. In some embodiments, one or more applications (e.g., gaming, music, video, calendars, lists, etc.) may be run by processor(s) 1102, and may be stored in memory 1104. In some embodiments, storage/memory 1104 may include one or more modules and/or databases, such as speech recognition module 1103, list of wakewords database 1116, and wakeword detection module 1118. Speech recognition module 1103 may, for example, include an automatic speech recognition ("ASR") component that recognizes human speech in detected audio. Speech recognition module 1103 may also include a natural language understanding ("NLU") component that determines user intent based on the detected audio. Also included within speech recognition module 1103 may be a text-to-speech ("TTS") component capable of converting text to speech to be outputted by speaker(s) 1110, and/or a speech-to-text ("STT") component capable of converting received audio signals into text to be sent to backend server 1108 for processing. List of wakewords database 1116 may be a database stored locally on voice-enabled communications device 102 that includes a list of a current wakeword for voice-enabled communications device 102, as well as one or more previously used, or alternative, wakewords for voice-enabled communications device. In some embodiments, user 102 may set or program a wakeword for voice-enabled communications device 102. The wakeword may be programmed directly on voice-enabled communications device 102, or a wakeword or words may be set by the individual via a backend server application (app) that is in communication with backend server 1108. For example, a user may use their mobile device having the backend server application running thereon to set the wakeword. The specific wakeword may then be communicated from the mobile device to backend server 1108, which in turn may send/notify voice-enabled communications device 102 of the individual's selection for the wakeword. The selected activation may then be stored in list of wakewords database 1116 of storage/memory 1104. Wakeword detection module 1118 may include an expression detector that analyzes an audio signal produced by microphone(s) 1108 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 1108. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 1108. The expression detector may then compare that score to a threshold to determine whether the wakeword will be declared as having been spoken. In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 102 may then begin sending the audio signal to backend server 1108 for detecting and responds to subsequent utterances made by a user. Communications circuitry 1106 may include any circuitry allowing or enabling voice-enabled communications device 102 to communicate with one or more devices, servers, and/or systems. For example, communications circuitry 1106 may facilitate communications between voice-enabled communications device 102 and backend server 1108. Communications circuitry 1106 may use any communications protocol, such as any of the previously mentioned exemplary communications protocols. In some embodiments, voice-enabled communications device 102 may include an antenna to facilitate wireless communications with a network using various wireless technologies (e.g., Wi-Fi, Bluetooth, radiofrequency, etc.). In yet another embodiment, voice-enabled communications device 102 may include one or more universal serial bus ("USB") ports, one or more Ethernet or broadband ports, and/or any other type of hardwire access port so that communications circuitry 1106 allows voice-enabled communications device 102 to communicate with one or more communications networks. Voice-enabled communications device 102 may also include one or more microphones 1108 and/or transducers. Microphone(s) 1108 may be any suitable component capable of detecting audio signals. For example, microphone(s) 1108 may include one or more sensors for generating electrical signals and circuitry capable of processing the generated electrical signals. In some embodiments, microphone(s) 1108 may include multiple microphones capable of detecting various frequency levels. As an illustrative example, voice-enabled communications device 102 may include multiple microphones (e.g., four, seven, ten, etc.) placed at various positions about voice-enabled communications device 102 to monitor/capture any audio outputted in the environment where voice-enabled communications device 102 is located. The various microphones 1108 may include some microphones optimized for distant sounds, while some microphones may be optimized for sounds occurring within a close range of voice-enabled communications device 102. Voice-enabled communications device 102 may further include one or more speakers 1110. Speaker(s) 1110 may correspond to any suitable mechanism for outputting audio signals. For example, speaker(s) 1110 may include one or more speaker units, transducers, arrays of speakers, and/or arrays of transducers that may be capable of broadcasting audio signals and or audio content to a surrounding area where voice-enabled communications device 102 may be located. In some embodiments, speaker(s) 1110 may include headphones or ear buds, which may be wirelessly wired, or hard-wired, to voice-enabled communications device 102, that may be capable of broadcasting audio. In some embodiments, one or more microphones 1108 may serve as input devices to receive audio inputs, such as speech. Voice-enabled communications device 102, may then also include one or more speakers 1110 to output audible responses. In this manner, voice-enabled communications device 102 may function solely through speech or audio, without the use or need for any input mechanisms or displays. In one exemplary embodiment, voice-enabled communications device 102 includes I/O interface 1112. The input portion of I/O interface 1112 may correspond to any suitable mechanism for receiving inputs from a user of voice-enabled communications device 102. For example, a camera, keyboard, mouse, joystick, or external controller may be used as an input mechanism for I/O interface 1112. The output portion of I/O interface 1112 may correspond to any suitable mechanism for generating outputs from voice-enabled communications device 102. For example, one or more displays may be used as an output mechanism for I/O interface 1112. As another example, one or more lights, light emitting diodes ("LEDs"), or other visual indicator(s) may be used to output signals via I/O interface 1112 of voice-enabled communications device 102. In some embodiments, one or more vibrating mechanisms or other haptic features may be included with I/O interface 1112 to provide a haptic response to user 102 from voice-enabled communications device 102. Persons of ordinary skill in the art will recognize that, in some embodiments, one or more features of I/O interface 1112 may be included in a purely voice-enabled version of voice communications device 102. For example, one or more LED lights may be included on voice-enabled communications device 102 such that, when microphone(s) 1108 receive audio from user 102, the one or more LED lights become illuminated signifying that audio has been received by voice-enabled communications device 102. In some embodiments, I/O interface 1112 may include a display screen and/or touch screen, which may be any size and/or shape and may be located at any portion of voice-enabled communications device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. FIG. 11 also includes backend server 1166, as mentioned previously, which may be in communication with voice-enabled communications device 102. Backend server 1166 (e.g., part of a resource provider environment) includes various components and modules including, but not limited to, automatic speech recognition ("ASR") module 1158 (which may include, for example, speech-to-text ("STT") functionality), natural language understanding ("NLU") module 1160, applications module 1162, and text-to-speech ("TTS") module 1164. In some embodiments, backend server 1166 may also include computer readable media, including, but not limited to, flash memory, random access memory ("RAM"), and/or read-only memory ("ROM"). Backend server 1166 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used. ASR module 1158 may be configured such that it recognizes human speech in detected audio, such as audio captured by voice-enabled communications device 102, which is then sent to backend server 1166. ASR module 1158 may include, in one embodiment, one or more processor(s) 1152, storage/memory 1154, and communications circuitry 1156. Processor(s) 1152, storage/memory 1154, and communications circuitry 1156 may, in some embodiments, be substantially similar to processor(s) 1102, storage/memory 1104, and communications circuitry 1106, which are described in greater detail above, and the aforementioned descriptions of the latter may apply. NLU module 1160 may be configured such that it determines user intent based on the detected audio received from voice-enabled communications device 102. NLU module 1160 may include processor(s) 1152, storage/memory 1154, and communications circuitry 1156. Applications module 1162 may, for example, correspond to various action specific applications or servers capable of processing various task specific actions. Applications module 1162 may further correspond to first party applications and/or third party applications operable to perform different tasks or actions. For example, based on the context of audio received from voice-enabled communications device 102, backend server 1166 may use a certain application to perform an action, such refining an active play queue of media content. Applications module 1162 may include processor(s) 1152, storage/memory 1154, and communications circuitry 1156. As an illustrative example, applications module 1162 may correspond to a media service. The electronic media service application of the applications module 1162 can be associated with a customer account. The customer account can include at least one profile stored in, for example, user information that can be linked to the electronic media service application in applications module 1162. Audio input data can be received at automatic speech recognition module 1158 from voice communications device 102. The automatic speech recognition module 1158 can use automatic speech recognition (ASR) techniques on the audio input data to generate text data of the audio input data. The natural language understanding module 1160 can use natural language understanding (NLU) techniques on the text data to determine refinement/attribute information to manage the active play queue. The electronic media service application of the applications module 1162 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music. TTS module 1164 may employ various text-to-speech techniques. It should be noted that techniques for taking text and converting it into audio input data that can represent speech are well known in the art and need not be described in further detail herein, any suitable computer implemented techniques may be used. TTS module 1164 may also include processor(s) 1152, storage/memory 1154, and communications circuitry 1156. Persons of ordinary skill in the art will recognize that although each of ASR module 1158, NLU module 1160, applications module 1162, and TTS module 1164 include instances of processor(s) 1152, storage/memory 1154, and communications circuitry 1156, those instances of processor(s) 1152, storage/memory 1154, and communications circuitry 1156 within each of ASR module 1158, NLU module 1160, applications module 1162, and STT/TTS module 1164 may differ. For example, the structure, function, and style of processor(s) 1152 within ASR module 1158 may be substantially similar to the structure, function, and style of processor(s) 1152 within NLU module 1160, however the actual processor(s) 1152 need not be the same entity.

Figure 12:
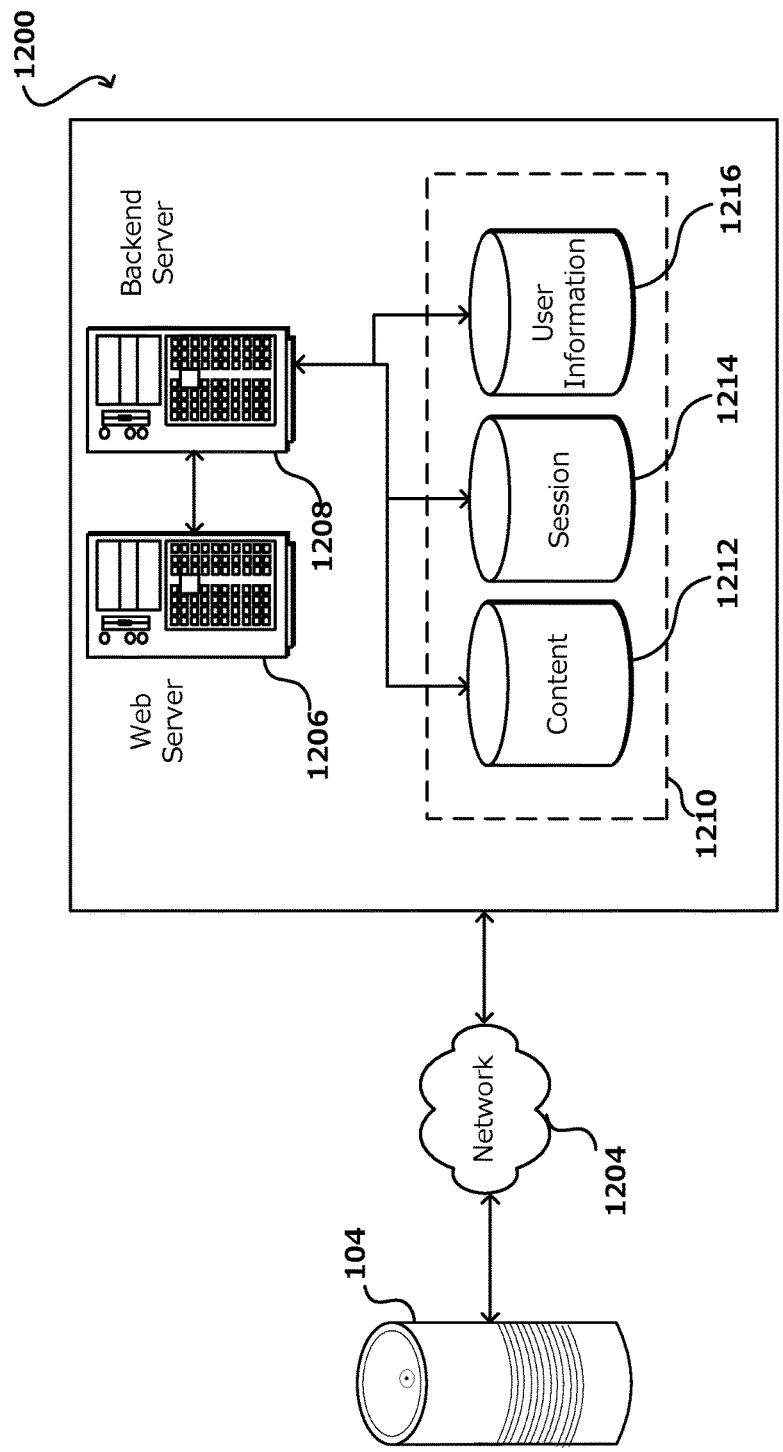
FIG. 12 illustrates an example implementation environment, in accordance with various embodiments of the present disclosure.

In accordance with various embodiments, different approaches can be implemented in various environments in accordance with the described embodiments. For example, FIG. 12 illustrates an example of an environment 1200 for implementing aspects in accordance with various embodiments (e.g., a resource provider environment). In accordance with various embodiments, different approaches can be implemented in various environments in accordance with the described embodiments. For example, FIG. 12 illustrates an example of an environment 1200 for implementing aspects in accordance with various embodiments (e.g., a resource provider environment). As will be appreciated, although a Web-based environment is used for purposes of explanation, different environments may be used, as appropriate, to implement various embodiments. The system includes voice communications device 102, which can include any appropriate device operable to send and receive requests, messages or information over network 1204 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art. The illustrative environment includes at least one backend server 1208 and a data store 1210. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 1208 can include any appropriate hardware and software for integrating with the data store 1210 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1206 in the form of HTML, XML or another appropriate structured language in this example. The handling of all requests and responses, as well as the delivery of content between the voice communications device 102 and the backend server 1208, can be handled by the Web server 1206. It should be understood that the Web and application servers are not required and are merely example components, as structured code discussed herein can be executed on any appropriate device or host machine as discussed elsewhere herein. The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be other information that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the backend server 1208 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive respective user profiles associated with a plurality of client devices connected to an audio streaming channel, the user profiles including respective user affinities;
   transmit first channel content to the plurality of client devices within a first syncing time window, the channel content being the same for all of the plurality of client devices;
   identify, from the plurality of client devices, a first group of client devices having a first shared affinity;
   transmit a first data stream including first group content to the first group following transmission of the first channel content to the first group;
   identify, from the plurality of client devices, a second group of client devices having a second shared affinity;
   transmit a second data stream to the second group following transmission of the first channel content, the second data stream distinct from the first data stream and including the second group content, the second group content different from the first group content; and
   transmit second channel content to first group following the first group content and to the second group following the second group content, the second channel content being the same for all of the plurality of client devices and transmitted to the plurality of client devices within a second syncing time window.

2. The system of claim 1, wherein the instructions when executed further cause the system to:
   provide individual content to an individual client device of the plurality of client devices, the individual content determined based at least in part on a user profile associated with the individual client device.

3. The system of claim 1, wherein the instructions when executed further cause the system to:
   receive a user input from a client device of the plurality of client devices to skip a portion of content; and
   replace a skipped portion of content with new content, the new content selected from a database of content associated with the audio streaming channel or from a collection of content associated with a user account associated with the client device.

4. The system of claim 1, wherein the instructions when executed further cause the system to:
   receive a user input from a client device of the plurality of client devices to add a song to a user account associated with the client device, the song being a portion of the first channel content or the first group content playing on the client device.

5. A computer-implemented method, comprising:
   providing channel content to a plurality of client devices within a first period of time;
   identifying one or more attributes associated with a first client device of the plurality of client devices;
   determining first personalized content for the first client device based at least in part on the one or more attributes associated with the first client device;
   transmitting a first data stream to the first client device, the first data stream including the first personalized content;
   identifying one or more attributes associated with a second client device of the plurality of client devices;
   determining second personalized content for the second client device based at least in part on the one or more attributes associated with the second client device, the second personalized content different from the first personalized content;
   transmitting a second data stream to the second client device, the second data stream distinct from the first data stream and including the second personalized content; and
   providing, within a second period of time, additional channel content to the first client device following the first personalized content and to the second client device following the second personalized content.

6. The method of claim 5, wherein the channel content is provided to the plurality of client devices at the same time or at respective offsets within the first period of time.

7. The method of claim 6, wherein the channel content includes a data stream of live content, pre-recorded content, listener-generated content received through the first client device, or a combination thereof.

8. The method of claim 5, wherein the channel content includes audio commentary or songs selected for all of the plurality of client devices, wherein the first personalized content includes audio commentary or songs selected for the first client device, and wherein the second personalized content includes audio commentary or songs selected for the second client device.

9. The method of claim 5, wherein the first client device is one of a first group of client devices associated with one or more shared attributes, the first group of client devices being provided the first personalized content.

10. The method of claim 5, wherein the first personalized content is selected from a database of content associated with an audio streaming channel or from a collection of content associated with a user account of the first client device.

11. The method of claim 5, further comprising:
    receiving a user input from the first client device; and
    changing content provided to the first client device based on the user input.

12. The method of claim 11, further comprising:
    wherein the user input includes a request to skip at least a portion of the channel content or the first personalized content.

13. The method of claim 12, further comprising:
    providing a recommendation to the client device to change to a different channel upon receiving a threshold number requests to skip content.

14. The method of claim 5, further comprising:
    receiving a user input from the first client device, the user input including a request to add a currently playing content item to a user account associated with the first client device.

15. The method of claim 11, wherein the user input is derived from a voice input received by a voice communication component of the first client device.

16. The method of claim 5, wherein the one or more attributes associated with the first client device includes at least one of: a user-defined or machine-learned affinity, a geographic location, or historical interaction behavior.

17. A system, comprising:

at least one computing device processor; and a memory device including instructions that, when executed by the at least one computing device processor, cause the system to:

provide channel content to a plurality of client devices within a first period of time;

identify one or more attributes associated with a first client device of the plurality of client devices;

determine first personalized content for the first client device based at least in part on the one or more attributes associated with the first client device;

transmit a first data stream to the first client device, the first data stream including the first personalized content;

identifying one or more attributes associated with a second client device of the plurality of client devices;

determine second personalized content for the second client device based at least in part on the one or more attributes associated with the second client device, the second personalized content different from the first personalized content;

transmit a second data stream to the second client device, the second data stream distinct from the first data stream and including the second personalized content; and provide, within a second period of time, additional channel content to the first client device following the first personalized content and to the second client device following the second personalized content.

18. The system of claim 17, wherein the channel content is provided to the plurality of client devices at the same time or at respective offsets within the first period of time.

19. The system of claim 18, wherein the channel content includes a data stream of live content, pre-recorded content, listener-generated content received through the first client device, or a combination thereof.

20. The system of claim 17, wherein the instructions when executed further cause the system to:

receiving a user input from the first client device; and changing content provided to the first client device based on the user input.

* * * * *